United States Patent

Lomp et al.

[11] Patent Number: 5,481,696
[45] Date of Patent: Jan. 2, 1996

[54] COMMUNICATION APPARATUS OPERATIVE TO SWITCH DYNAMICALLY BETWEEN DIFFERENT COMMUNICATION CONFIGURATIONS BY INDEXING EACH SET OF CONFIGURABLES WITH A UNIQUE MEMORY ADDRESS

[75] Inventors: Martin G. Lomp, Wrentham; Philip R. Hardaker, Watertown, both of Mass.

[73] Assignee: Motorola, Inc.

[21] Appl. No.: 203,890

[22] Filed: Mar. 1, 1994

Related U.S. Application Data

[63] Continuation of Ser. No. 628,761, Dec. 17, 1990, abandoned.

[51] Int. Cl.[6] .................................................. G06F 3/00
[52] U.S. Cl. .................. 395/500; 364/238.5; 364/240.7; 364/247.2; 364/247.5; 364/255.2; 364/DIG. 1; 364/919; 364/929; 364/933.4
[58] Field of Search .............................. 395/500, 250, 395/275, 600, 575, 200, 800; 360/69; 380/48; 370/80; 264/DIG. 1, DIG. 2

[56] References Cited

U.S. PATENT DOCUMENTS

| | | | |
|---|---|---|---|
| 3,714,635 | 1/1973 | Hamilton et al. | 340/172.5 |
| 3,846,763 | 11/1974 | Riikonen | 395/275 |
| 4,270,202 | 5/1981 | Stuttard et al. | 370/80 |
| 4,385,384 | 5/1983 | Rosbury et al. | 371/20.6 |
| 4,403,303 | 9/1983 | Howes et al. | 395/500 |
| 4,500,933 | 1/1985 | Chan | 360/69 |
| 4,646,320 | 2/1987 | Krishnan | 375/8 |
| 4,718,082 | 1/1988 | Parker et al. | 379/98 |
| 4,742,482 | 3/1988 | Inskeep et al. | 395/575 |
| 4,872,197 | 10/1989 | Pemmaraju | 379/93 |
| 4,899,306 | 2/1990 | Greer | 395/500 |
| 4,905,282 | 2/1990 | McGlynn et al. | 380/48 |
| 4,964,124 | 10/1990 | Burnett | 371/15.1 |
| 5,109,503 | 4/1992 | Cruickshank et al. | 395/500 |
| 5,153,897 | 10/1992 | Sumiyoshi et al. | 375/8 |
| 5,202,983 | 4/1993 | Orita et al. | 395/600 |
| 5,214,760 | 5/1993 | Hammond et al. | 395/250 |

Primary Examiner—Meng-Ai An
Attorney, Agent, or Firm—Darleen J. Stockley

[57] ABSTRACT

Communication apparatus is operative to switch communication dynamically between itself and a selected one of a predetermined plurality of mating communication devices of different configurations. A memory is provided for storing a plurality of different sets of configurables with each set of the plurality corresponding to a communication configuration associated with a corresponding mating communication device of the predetermined plurality. Each set of configurables being indexed in the storing means by a unique memory address. A controller is also provided and is responsive to a command signal to select an index memory address for use by the communication apparatus to functionally configure itself in accordance with the set of configurables of the memory storage corresponding to the index memory address selected by the command signal. An entry device may be coupled to the controller for entering the index memory addresses of at least two sets of configurables into a portion of memory. Accordingly, the controller in response to the command signal may select an index memory address from that portion of memory for use by the apparatus to access and use the set of configurables of the memory corresponding thereto.

15 Claims, 5 Drawing Sheets

COMMUNICATION APPARATUS OPERATIVE TO SWITCH DYNAMICALLY BETWEEN DIFFERENT COMMUNICATION CONFIGURATIONS BY INDEXING EACH SET OF CONFIGURABLES WITH A UNIQUE MEMORY ADDRESS

This is a continuation of application Ser. No. 07/628,761, filed Dec. 17, 1990, and now abandoned.

BACKGROUND OF THE INVENTION

The present invention relates to communication apparatus in general, and more particularly to communication apparatus operative to switch dynamically communication between itself and any one of a plurality of mating communication devices of differing communication configurations.

Today, data terminal equipment (DTE), such as main frame computers, personal computers and the like, may communicate digital information amongst each other over some communication medium. Each data terminal employs data communication equipment (DCE), such as a modem, for example, to convert the digital information from the DTE into appropriate signals for transmission over the communication medium to a mating DCE and similarly to reconvert the received signals from the mating DCE back into corresponding digital information for the receiving data terminal. Modern communication equipment has become very sophisticated with the utilization of micro-computer systems which permit the equipment to be configured with a wide variety of optional features which are known as "configurables" and sometimes referred to as "straps". An example of a set of configurables is shown in Table 1 infra.

In modern modems, such as those manufactured by Codex bearing Model Nos. 2266, 2660 and 2264, for example, a prespecified portion of memory known as the active configuration memory stores binary codes representing the chosen option of each configurable. Each configurable of a given set is assigned a bit or plurality of bits of memory storage in the active configuration memory. And, the binary coding of the assigned bits represent the desired option of the configurable or strap. For example, referring to Table 1, the modulation mode may have 8 different options and therefore requires at least three bits of assignable memory storage. The assignable bits then may be coded according to the option desired. If auto V.32 is chosen as the desired option, the bits may be coded "001", for example. Note that for the configurables of low speed format, adaptive rate selection, long space disconnect, and so on have only two options and therefore require only one bit of assignable memory storage. Accordingly, the binary coding, that is "0" or "1", determines the selected option for each of these configurables. It is understood that the options of the set of configurables for the communication device are chosen so that it may be compatible in its communication configuration with the communication device it desires to mate with. Generally, a modem stores only one set of configurables in its active configuration memory which it uses to configure itself for compatible communication with a predetermined mating communication device.

At least one known modem accommodates the storage of different sets of configurables, but has only one active configuration memory for use in configuring itself. This modem is programmed to permit a manual strap change, that is, to allow the loading of another set of configurables from the stored sets of configurables into the active configuration memory by manually entering commands through a front panel. The drawback to this, of course, is that it cannot be accomplished dynamically, that is, automatically in response to some demand situation without user intervention and without the interruption of communication. User intervention for this purpose is not always convenient, because the modem may not be at the same location as the user requiring the user to go to the location of the modem which may be in another building, in some cases, to initiate manually the change in sets of configuration to permit the modem to configure itself to be compatible with another mating communication device.

The interruption of communication is especially a critical factor where a remote office, like a bank, for example, is communicating large volumes of information to a central office over a high speed leased line medium and the leased line fails for one reason or another. Modern modems have the capability of restoring communication through a backup dial line network automatically. This process is commonly referred to in the industry as "restoral". However, because the modem is restricted to only one set of configurables stored in its active configuration memory it may have to reestablish communication with the same mating communication device to retain compatibility in the communication configuration.

It is desired for some critical situations, especially for the restoral situation, that the transmitting modem be capable of switching communication dynamically to another mating communication device of a different configuration. During restoral, for example, this feature permits the modem to auto dial a predetermined modem of a central service center, for example, to apprise the center of a failure of the leased line. In addition, in a packet switching network, when the primary node is identified as malfunctioning, the modem may restore communication through a secondary or alternate node automatically without loss of communication and without human intervention. The present invention renders a communication device which overcomes the aforementioned drawbacks of present modems and provides for the above stated dynamic switching feature.

SUMMARY OF THE INVENTION

In accordance with the present invention, communication apparatus is operative to switch communication dynamically between itself and a selected one of a predetermined plurality of mating communication devices of differing configurations. The communication apparatus comprises a storing means and a control means. The storing means stores a plurality of different sets of configurables with each set of configurables of the plurality corresponding to a communication configuration associated with a corresponding mating communication device. Each set of configurables is indexed in the storing means by a unique memory address. The control means is responsive to a command signal to select an index memory address for use by the apparatus to functionally configure itself in accordance with the set of configurables of the storing means corresponding to the index memory address selected by the command signal.

In one embodiment, the control means responds to the command to dynamically control the apparatus to switch from using the set of configurables of the memory means associated with a first mating communication device to use the set of configurables of the memory means associated with a second mating communication device for establishing the communication configuration thereof.

In yet another embodiment, the communication apparatus is operative to switch communication dynamically between itself and any one of at least two mating communication devices selected from a predetermined multiplicity of mating communication devices of different configurations. In connection with this embodiment, a second storing means is used to store the index memory addresses of the sets of configurables corresponding to the selected at least two mating communication devices. An entry device may be used for entering the index memory addresses of the selected sets of configurables into the second storing means. The control means responds to the command signal to access an index memory address from the second storing means and to load a third storing means with the set of configurables from the first storing means corresponding to the accessed index memory address. The apparatus may then functionally configures itself in accordance with the set of configurables loaded into the third storing means as selected by the command signal.

DESCRIPTION OF THE PREFERRED EMBODIMENT

Figure 1:
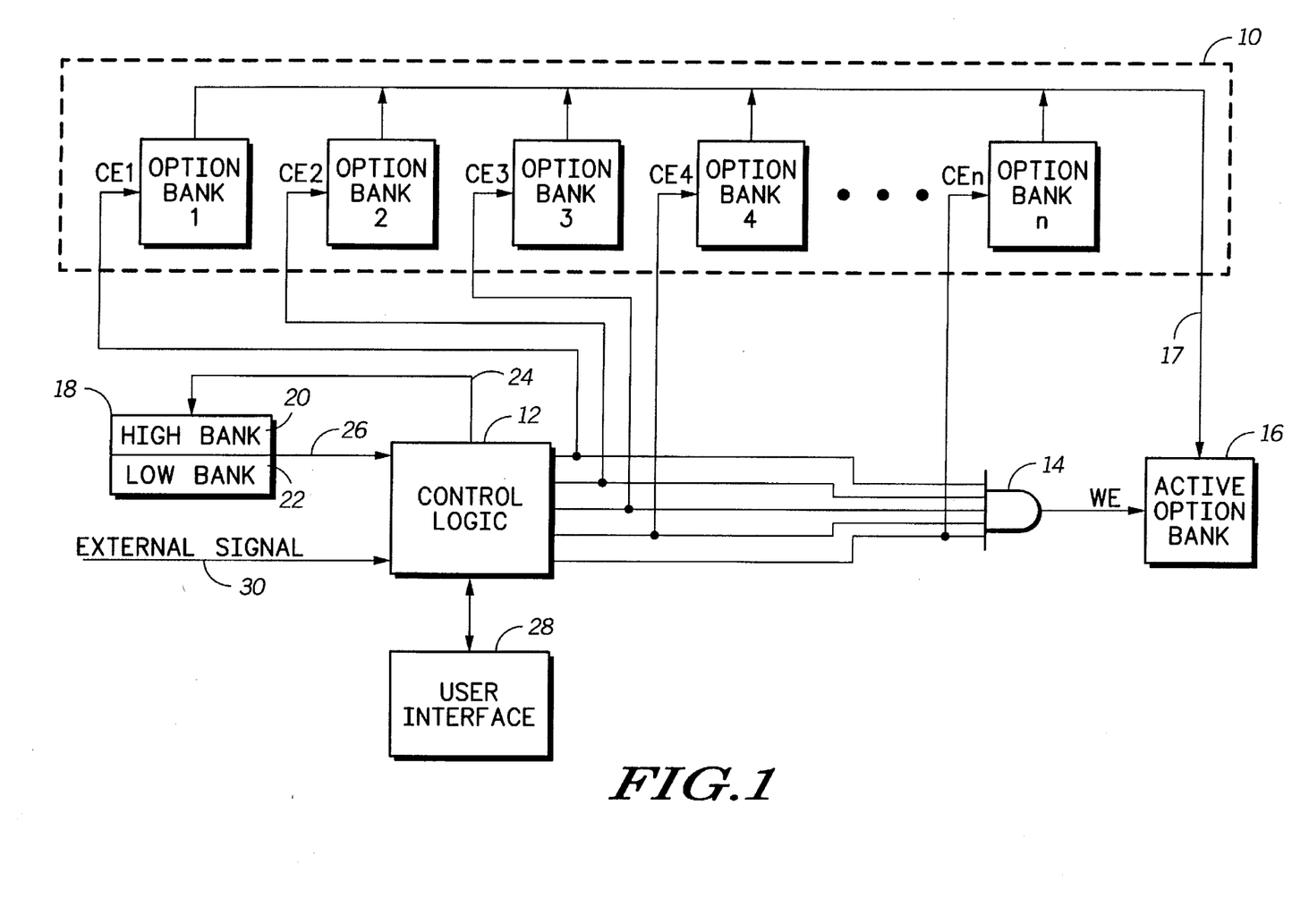
FIG. 1 is a functional block diagram schematic of communication apparatus which is suitable for embodying the principles of the present invention.

A functional block diagram of apparatus of a communication device, such as a modem, for example, which apparatus may be used for embodying the principles of the present invention, is shown in FIG. 1. A typical modem suitable for accommodating the embodiment of FIG. 1 may be of the type manufactured by Codex bearing Model Nos. 2266, 2660 or 2264, for example, all of which have been marketed by Codex more than one year prior to the filing date of the instant application. The construction and operation of these type modems in configuring itself using the set of configurables stored in the active configuration memory thereof is well known to all those skilled in the pertinent art. Accordingly, the details of how a modem configures itself using the set of configurables of the active configuration memory will not be described herein for this reason.

Referring to FIG. 1, a conventional storage memory 10, which may be of the non-volatile type for the present embodiment, stores a plurality 1–n of different sets of configurables with each set of configurables of the plurality corresponding to a communication configuration compatible with a corresponding mating communication device. In the present embodiment, the storage memory 10 includes a plurality of memory storage banks, denoted as 1–n, for storing correspondingly each of the plurality of different sets of configurables. As mentioned above, a typical set of configurables and the possible options of each is shown in Table 1 infra. Control logic apparatus 12 which may be a conventional microcomputer system, for example, is coupled to the memory 10 through a set of control and address lines denoted as OE1–OEn. The lines OE1–OEn are coupled respectively to the memory storage banks 1–n. Further, the signal lines OE1–OEn are coupled to respective inputs of an OR gate 14 which generates a write enable signal (WE).

Further included in the embodiment of FIG. 1 is an active configuration memory 16 which is loadable with a set of configurables accessed from a selected memory bank utilizing a data bus 17 and write enable signal (WE). The set of configurables of the memory 16 is used by the modem in configuring itself in a communication configuration compatible with the desired mating communication device. This operation is well known to all those skilled in the pertinent art and requires no further description here. Still further included in the embodiment of FIG. 1 is another memory 18 coupled to the control logic 12. For the purposes of the present embodiment, the memory 18 includes two registers 20 and 22 for a storage of address information. The control logic 12 may select one of the registers 20 or 22 from the memory 18 using the control and address lines 24 and the contents of the selected register 20 or 22 is provided to the control logic 12 although signal lines 26. A user interface 28 may also be provided and coupled to the control logic 12. In the present embodiment, the user interface may be a conventional modem front panel with pushbuttons for entering information via the control logic 12 into the memory 18. Finally, a command signal is coupled to the control logic 12 over a signal line 30.

Figure 2:
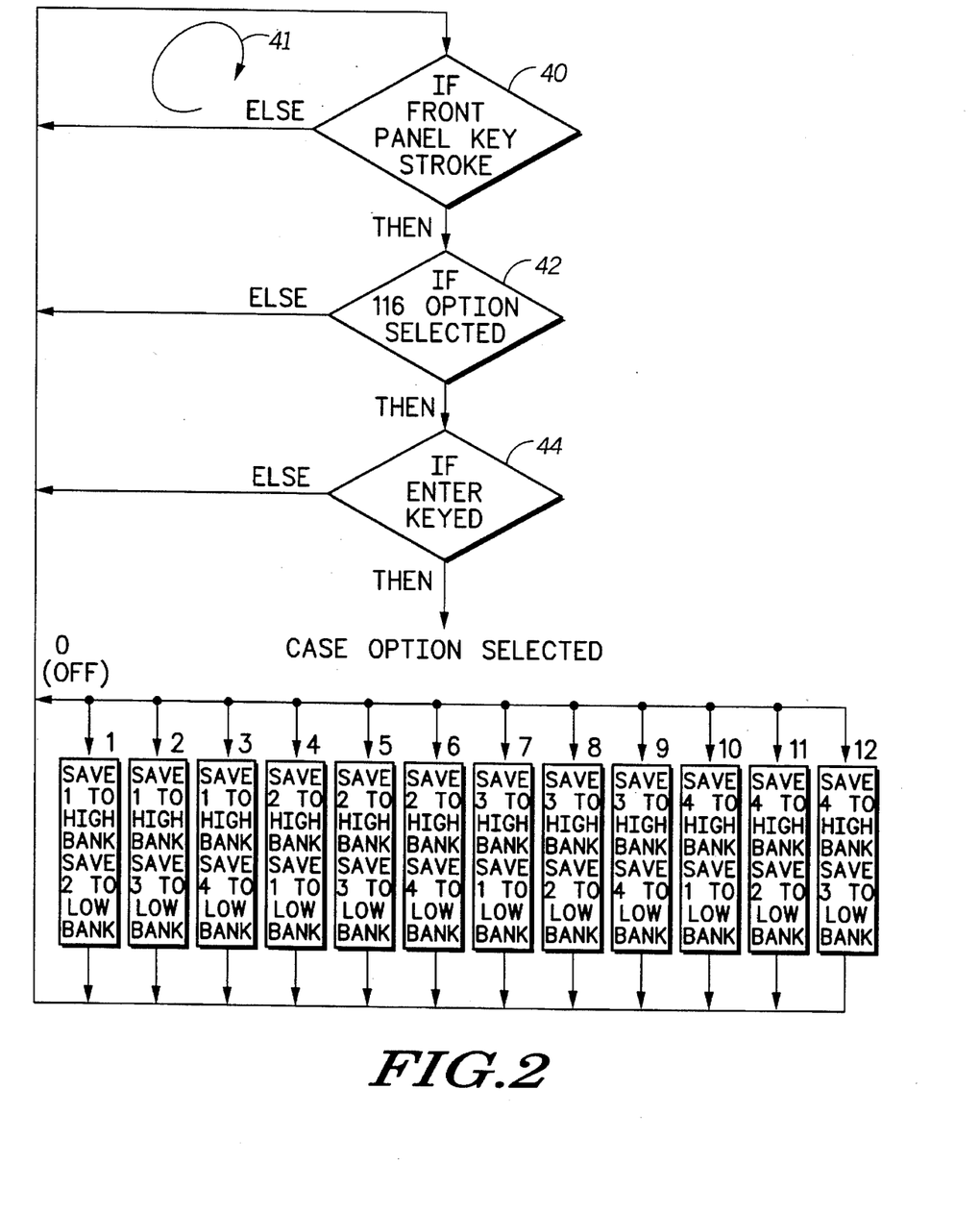
FIG. 2 is an exemplary software flowchart for use by the embodiment of FIG. 1 in performing one aspect of the present invention.

Further in the present embodiment, each of the memory banks 1–n may be indexed by a unique memory address for accessing the set of configurable stored therein and loading them into the active configuration memory 16 via data bus 17. At least two sets of configurables may be chosen by an operator through the front panel 28 by entering the index memory addresses of their corresponding memory banks into the registers 20 and 22 of memory 18 via control logic 12. An exemplary software flowchart for use by the control logic 12 for performing this function is depicted in FIG. 2. Referring to FIG. 2, in the decisional block 40 the control logic 12 first determines if a particular key or pushbutton has been stroked via the front panel 28. The decisional block 40 sits in a loop 41 until the particular pushbutton or key has been stroked, at which time execution continues at the decisional block 42. In block 42, it is determined whether or not the control logic has been selected to respond to the command signal 30. If not, the execution is returned to the block 40 and nothing happens. However, if the command option has been selected the execution continues at block 44. In block 44, the control logic 12 awaits a keyed in number from a keypad, for example, through the front panel 28. If no number is entered after a time out period the execution is returned to decisional block 40. Should the number be entered within the allowed time interval, the instructions of the particular case option 1–12 corresponding to the entered number are carried out and then, execution returns to block 40.

In the example of FIG. 2, twelve case option instructional blocks have been preprogrammed utilizing four memory storage banks 1–4. For example, if case option block 1 is chosen the index memory address of the memory bank 1 is stored in the high bank register 20 of memory 18 and the index memory address of the memory bank 2 is stored in the low bank register 22 of memory 18 and so on for the remaining case options 2–12. Now, once the at least 2 sets of configurables had been selected through the front panel 28 and the index memory addresses corresponding thereto are stored in memory 18, the command option permitting the communication apparatus to switch communication dynamically between itself and a selected one of a predetermined plurality of mating communication devices of different configurations may occur.

Figure 3A:
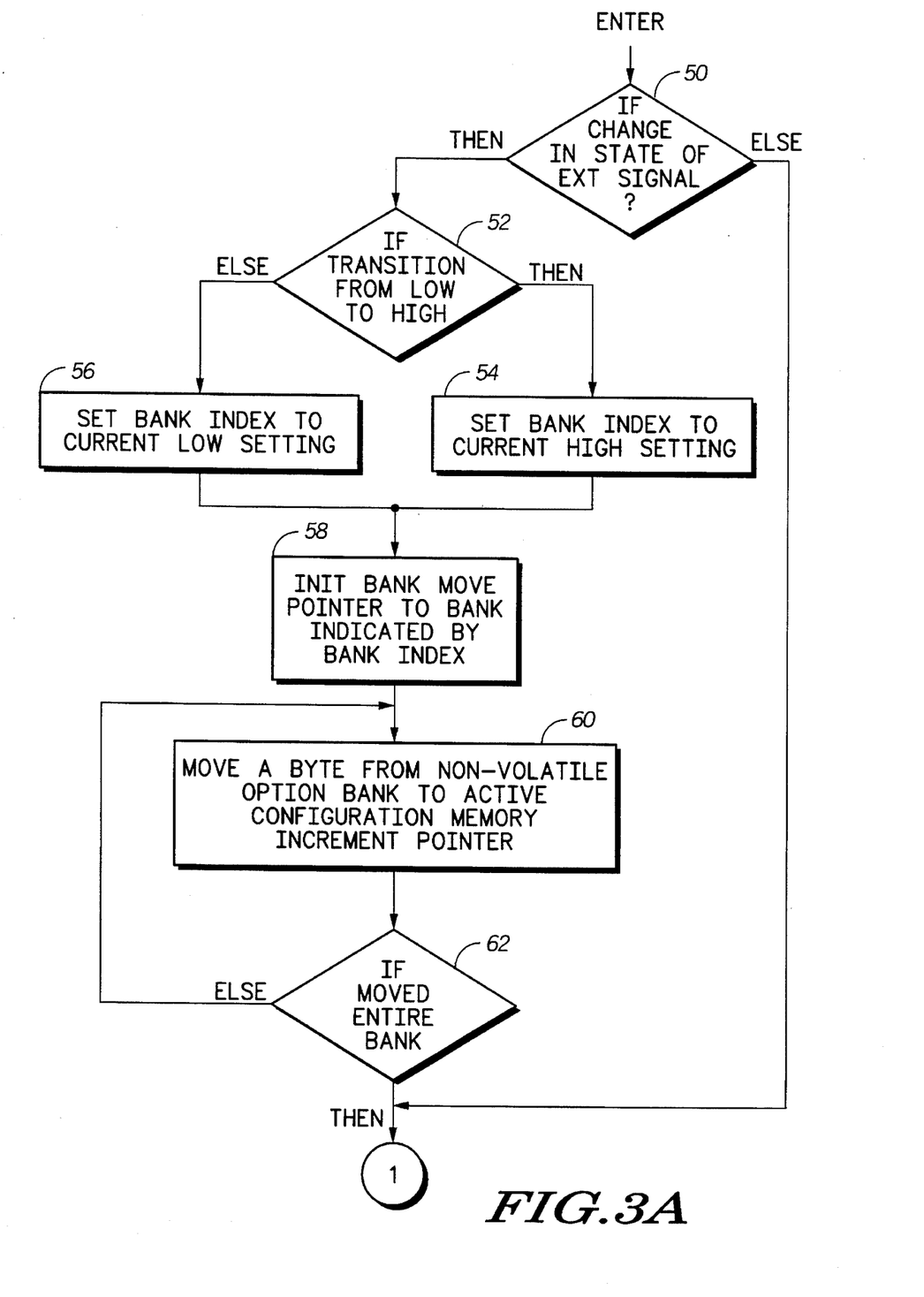
FIGS. 3A and 3B depict an exemplary software flowchart for use by the embodiment of FIG. 1 in performing another aspect of the present invention.
Figure 3B:
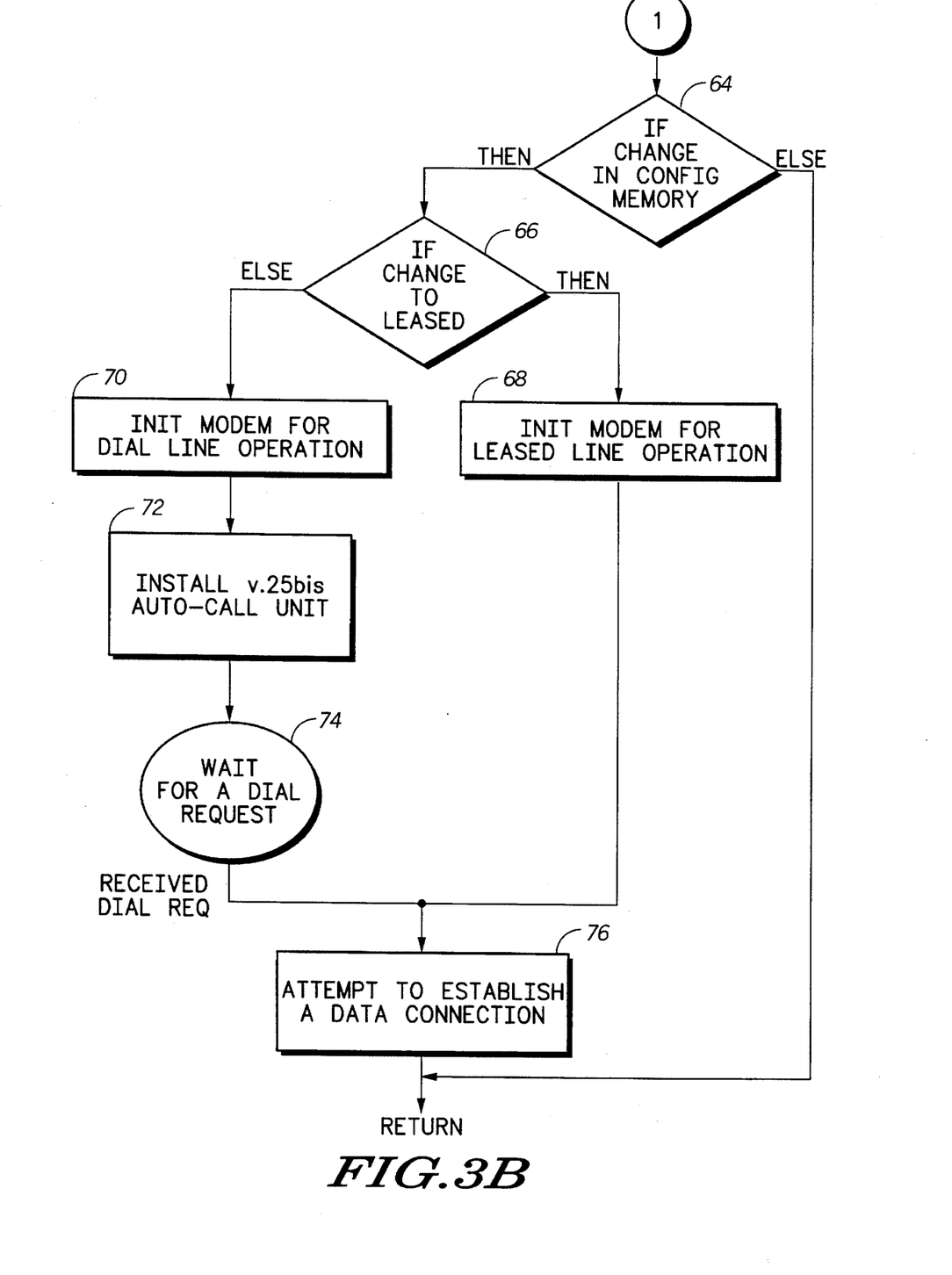

An exemplary flowchart for use by the control logic 12 to accomplish this dynamic communication switching operation is shown in FIGS. 3A and 3B. Starting with FIG. 3A, the operation is entered at decisional block 50 where the control logic 12 determines whether or not there has been a change in the state of the command signal 30. If there has been no change, the programming logic of FIG. 3A is circumvented and execution continues into the program logic of FIG. 3B. If a change in the state of the command signal 30 is detected by the block 50 then execution continues at decisional block 52 wherein it is determined whether the transition was from low to high or from high to low. If from low to high, the control logic 12 is instructed to access the index memory address of the high bank register 20 of memory 18 for further use using the operational block 54. Otherwise, block 56 instructs control logic 12 to access the index memory address of the low bank register 22. In the next operational block 58, the memory bank corresponding to the accessed index memory address is enabled utilizing the control lines OE associated therewith and the corresponding address lines of the enabled memory bank are set to the first byte register thereof.

Next, operational blocks 60 and 62 carry out the operation of loading the set of configurables of the enabled memory bank into the active configuration memory, more specifically, the content of the addressed byte register is provided from the enabled memory bank to the active configuration memory 16 over the data lines 17 in accordance with the instructions of operational block 60. Concurrently therewith, the OR gate 14 detects the generated enable signal OE and directs a write enable (WE) signal to the memory 16 to permit the data on the data line 17 to be written into the appropriate address register of the memory 16. Operational block 60 then increments the address pointer to the next byte register of both of the enabled option bank memory and active configuration memory and moves on to the decisional block 62. In 62, it is determined whether the complete set of configurables of the enabled memory bank has been loaded into the active configuration memory 16. If not, the operational blocks 60 and 62 are reexecuted until the entire loading procedure has been complete. Thereafter, execution continues at decisional block 64 in the flowchart of FIG. 3B.

Referring to FIG. 3B, the decisional block 64 determines if a change in the set of configurables of the configuration memory 16 has taken place. If not, the remaining program steps of FIG. 3B are circumvented and the program execution returns to the executive. Otherwise, it is next determined in the decisional block 66 if the change in configuration is to leased line or dial line operation. If the current configuration is for leased line operation, block 68 is executed next and modem is initialized for conventional modem operation in a leased line environment. Otherwise, the modem is initialized for dial line operation in block 70 and an auto-call unit, such as v.25bis, for example, is requested in block 72. The program then waits for a dial request in block 74, and when the request is received, program execution continues. Program execution continues from either block 68 or 74 in block 76 wherein a data connection is established in the mating communication device corresponding to the communication configuration established by the set of configurables of the active configuration memory 16.

A typical set of configurables which has been referenced to hereabove is shown in the Table 1 below along with typical options therefor.

TABLE 1

| Session Specific Straps | Default (Option Set) | Option Description (Saved In EEPROM when "save changes" executed) | Front Panel Node | At ACU | NTWK | At No Access |
|---|---|---|---|---|---|---|
| Modulation Mode cm_mod_ mode | 1 2 3 4 | 0 = V.32 bis Auto<br>1 = Auto V.32<br>2 = V.32 bis only<br>3 = V.32 only<br>4 = V.22 bis only<br>5 = 212 only<br>6 = v.21 only<br>7 = 103 only | Mod Mode =<br>NAT_<br>MODMODE | | | |
| Auto Type cm_ autotype | 1 2 3 4 | 0 = OOITT<br>1 = Codex | Auto Type=<br>NAT_ATYPE | | | |
| Modulation Max/Min Data Rates (option selections depend on modulation mode) cm_min_ rate cm_max_ rate | min<br><br><br><br><br><br><br>max | 0 = 300 bps<br>1 = 1200 bps<br>2 = 2400 bps<br>3 = 4800 bps<br>4 = 7200 bps<br>5 = 9600 bps<br>6 = 12 kbps<br>7 = 14.4 kbps | Min/Max<br>Rate<br>NAT_<br>MAXRATE<br><br>NAT_<br>MINRATE | | | |
| Low Speed Format | Country Specific | 0 = Bail<br>1 = OOITT | Low Speed<br>NAT_<br>LOWSPEED | | | |
| Adaptive Rate | 1 2 3 4 | 0 = Off<br>1 = On | Adaptv =<br>NAT_ | | | |

TABLE 1-continued

| Session Specific Straps | Default (Option Set) | Option Description (Saved In EEPROM when "save changes" executed) | Front Panel Node | At ACU | NTWK | At No Access |
|---|---|---|---|---|---|---|
| Selection cm_ adaptive | | | ADAPTIVE | | | |
| Modem Mode select cm_mode_ select | 1 3<br>2 4 | 0 = Originate<br>1 = Answer<br>2 = External<br>3 = Auto answer In Originate | Mode = NAT_ANSORG | AT CA | | |
| synonronous Clock Select cm_timing_ select | 1 2 3 4 | 0 = internal transmitter timing<br>1 = External transmitter timing<br>2 = Loopback transmitter timing | Clock = NAT_CLOCK<br><br>I | AT&X | | |
| Automatic retrain control cm_auto_ retrain | 1 2 3 4 | 0 = Auto retrain disabled<br>1 = Auto retrain enabled on low EER<br>2 = Auto retrain enabled on high EER | Retrain = NAT_ RETRAIN | AT RT | | |
| Longspace Disconnect cm_ longspace | 1 2 3 4 | 0 = Disable<br>1 = Enable | Longspace = NAT_ LONGSPACE | ATY | | |
| PSTN Cleardown cm pstn | 1 2 3 4 | 0 = Disable<br>1 = Enable | PSTN = NAT_PSTN | AT MD | | |
| DTE rate cm_dte_ rate | | 0 = 75 bits,sec<br>1 = 150<br>2 = 300<br>3 = 600<br>4 = 1200<br>5 = 2400<br>6 = 4800<br>7 = 7200<br>8 = 9800<br>9 = 12 kbits/sec | DTE Rate = NAT_ DTERATE | | | |
| | 2 3 | 10 = 14.4<br>11 = 16.8 | | | | |
| | 4 | 12 = 19.2<br>13 = 21.6<br>14 = 24<br>15 = 38.4 | | | | |
| | 1 | 16 = autobaud | | | | |
| Speed Conversion cm_speed_c onvert | 1 2 3 4 | 0 = Disable<br>1 = Enable | Speed Conver = NAT_SPDCON | AT SC | | |
| Character length cm_char lenght | 1 2 3 4 | 0 = 8 bit character length<br>1 = 9 bit character length<br>2 = 10 bit character length<br>3 = 11 bit character length | Char Length = NAT_ CHARLEN | | | |
| DTR Control cm_dtr_ control | 1<br><br><br>4 | 0 = DTR high, Ignored by DCE<br>1 = Escape<br>2 = Disconnect on DTR high to low<br>3 = reset<br>4 = Tall(108/1 plus autoanswering with DTR off)<br>5 = 108/1<br>6 = 108.2 | DTR = NAT_DTR | | | |
| DTR delay for switching cables cm_dtr_ delay | 1 2 3 4 | 0 = time set by ATS25<br>1 = 10 seconds<br>2 = 15 seconds | DTR Delay = NAT_DTRDLY | | | |
| RTS | 1 2 3 4 | 0 = RTS normal | RTS | AT & R | | |

TABLE 1-continued

| Session Specific Straps | Default (Option Set) | Option Description (Saved In EEPROM when "save changes" executed) | Front Panel Node | At ACU | NTWK | At No Access |
|---|---|---|---|---|---|---|
| Control cm_rts control | | 1 = RTS high<br>2 = Remote | NAT_RTS | | | |
| CTS control cm_cts_ control (CTS control for all other modes) | 2 3 4<br>1 | 0 = CTS high<br>1 = CTS normal<br>2 = CTS on during ACU<br>3 = Async/Sync | CTS = NAT_CTS | AT CT | | |
| RTS/CTS delay cm_rts_cts dly | 2 3 4<br><br>1 | 0 = No delay<br>1 = 15 millisecond delay<br>2 = 60 millisecond delay<br>3 = 90 millisecond delay<br>4 = delay set by ATS26 | RTS/CTS Delay = NAT_DCO | AT DL | | |
| DCD Control cm_dcd_ control | 1<br>2 3 4 | 0 = DCD high<br>1 = DCD normal<br>2 = DCD on for ACU<br>3 = DCD remote | DCD = NAT_DCD | AT&C | | |
| DSR Control cm_dsr_ control | 3 4<br>1<br>2 | 0 = DSR normal<br>1 = DSR high<br>2 = DSR follows DTR<br>3 = drop on disconnet<br>4 = simulate leased line | DSR = NAT_DSR | AT & S<br>AT MR | | |
| Overspeed cm_ overspeed | 1 2 3 4 | 0 = 1%<br>1 = 2.5% | Overspeed = NAT_ OVERSPD | | | |
| Answer Control cm_auto_ answer | Country Specific | 0 = Manual answer, auto answer disabled<br>1 = Auto answer after 1 ring<br>2 = Auto answer after 2 rings<br>3 = Auto answer after 4 rings<br>4 = Auto answer after 8 rings<br>5 = Auto answer after ringcount set by ATS0 | Answer = NAT_ANSWER | AT AA | | |
| Default dial address number cm_default dial | 2 4<br>1 3 use #1 | 0 = default dial disabled<br>1–9 = dial from phone number n | Default Dial = NAT_ DEFDIAL | AT DA | | |
| Line Select cm_line_ select | 1 2 3 4 | 0 = dial line<br>1 = 2 wire lease line | Line = NAT_ LINETYPE | AT & L | | |
| Restoral enable cm_ restoral | 1 2 3 4 | 0 = restoral disable<br>1 = restoral by front panel only<br>2 = restoral by 108/1<br>3 = restoral by circuit 115<br>4 = auto restoral | Restore = NAT_ RESTORE | | | |
| Lease to dial Restoral Select cm_restore select | 1 2 3 4 | 0 = low/fast<br>1 = low/slow<br>2 = high/fast<br>3 = high/slow | L to D = NAT_LTCD | | | |

TABLE 1-continued

| Session Specific Straps | Default (Option Set) | Option Description (Saved In EEPROM when "save changes" executed) | Front Panel Node | At ACU | NTWK | At No Access |
|---|---|---|---|---|---|---|
| Dial to lease retry time cm_dtol_time | 1 2 3 4 | 0 = manual<br>1 = 15 minutes<br>2 = 30 minutes<br>3 = 1 hour<br>4 = 2 hours<br>5 = 4 hours | D to L NAT_DTCL | | | |
| Hold Dial Line cm_hold_dial | 1 2 3 4 | 0 = off<br>1 = on | Hold Dial = NAT_HOLDLINE | | | |
| EC Data Transfer Mode select cm_ac_mode | 2 3<br><br>1 4 mode | 0 = Direct Mode<br>1 = Normal mode<br>2 = Reliable mode<br>3 = Auto reliable<br>4 = speed dependant auto reliable | Mode = NAT_ECMODE | AT SM | | |
| Error Correction cm_ec_select | 1 2 3 4 | 0 = V.42<br>1 = LAPM only<br>2 = MNP only | EC = NAT_ECSLOT | AT EC | | |
| Data Compression cm_data_comp | 1 2 3 4 | 0 = Off<br>1 = On | DC = NAT_DOENABLE | AT DC | | |
| Flow control selection cm_flow_cntl (local-terminal) | 1 2 3 4 | 0 = off, no flow control<br>1 = XON/XOFF with no pass through<br>2 = DTR/CTS<br>3 = RTS/CTS<br>4 = XON/XOFF with pass through | Flow = NAT_FLOWCTL | AT FL | | |
| Error Correction break select cm_ec_break | 1 2 3 4 | 0 = Destructive and expedited<br>1 = Non-destructive and expedited<br>2 = Non-destructive and non-expedited | Break = NAT_EOBREAK | AT BK | | |
| Modem Flow cm_modem_flow | 1 2 3 4 | 0 = Off<br>1 = On | Modem Flow = NAT_MODFLOW | AT MF | | |
| EC connect message control cm_ec_con_msg | 1 2 3 4 | 0 = off (Hayes connect messages)<br>1 = Short (reliable connect messages)<br>2 = Long (expanded reliable connect messages) | Reliable Msg = NAT_RELMSG | AT XD | | |
| EC Identification cm_ec-id | 1 2 3 4 | 0 = default<br>1 = Codex | EOID = NAT_EOID | AT S | | |
| ACU Selection cm_-acu_select | 1<br>3<br>2 4 | 0 = AT<br>1 = V.25<br>2 = No ACU | ACU Select = NAT_ACUSLOT | | | |
| AT Format cm_at_format | 1 2 3 4 | 0 = Async<br>1 = Sync/data<br>2 = Sync 2<br>3 = Sync 3 | AT Form = NAT_ATFORM | AT&M | | |
| V.25 bis Format cm_v25_format | 1 2 3 4 | 0 = Async<br>1 = Async/Sync<br>2 = Bitsync<br>3 = Charsync | V25 Form = NAT_V25FORM | AT & M | | |
| No ACU Selected Format cm_noacu_format | 1 4<br>2 3 | 0 = Async<br>1 = Sync | NOACU Form = NAT_NCACU | AT & M | | |
| V.25bis character set | 1 2 3 4 | 0 = ASCII character set<br>1 = EBOIDIO | Char Set = NAT_CHARSET | | | |

TABLE 1-continued

| Session Specific Straps | Default (Option Set) | Option Description (Saved In EEPROM when "save changes" executed) | Front Panel Node | At ACU | NTWK | At No Access |
|---|---|---|---|---|---|---|
| cm_v25_char set V.25bis sync Idle character cm_idle_mode | 1 2 3 4 | character set<br>0 = mark<br>1 = character | ACU Idle = NAThd — AOUIDLE | | | |
| V.25bis response cm_v25_call_resp | 1 2 3 4 | 0 = call response disabled<br>1 = bis<br>2 = bisrate<br>3 = val | Resp = NAT_ RESPONSE | | | |
| Parity cm_v25_parity | 1 2 3 4 | 0 = V.25 bis<br>1 = even parity<br>2 = odd parity<br>3 = mark parity<br>4 = space parity | Parity = NAT_PARITY | | | |
| Echo async chars to DTE cm_v25_par-ity | 1 2 3 4 | 0 = echo disabled<br>1 = echo enabled | Async Echo = NAT_ECHO | ATE | | |
| Time to send Connect Message cm_conmsg_time | 1 2 3 4 | 0 = Off, message sent after DCO<br>1 = On, message sent before DCD for AT | Msg Early = NAT_ MSGEARLY | | | |
| Result code display Quiet mode cm_result_code | 1 2 3 4 | 0 = enable ATCO result code<br>1 = disable AT01 result code | RsltCode = Nat_ RSLTCODE | ATC | | |
| Message format control cm_result_form | 1 2 3 4 | 0 = ATV0 short form-numerical codes<br>1 = ATV1 long form-full word result codes | RsitForm = NAT_ RSLTFORM | ATV | | |

Figure 4:
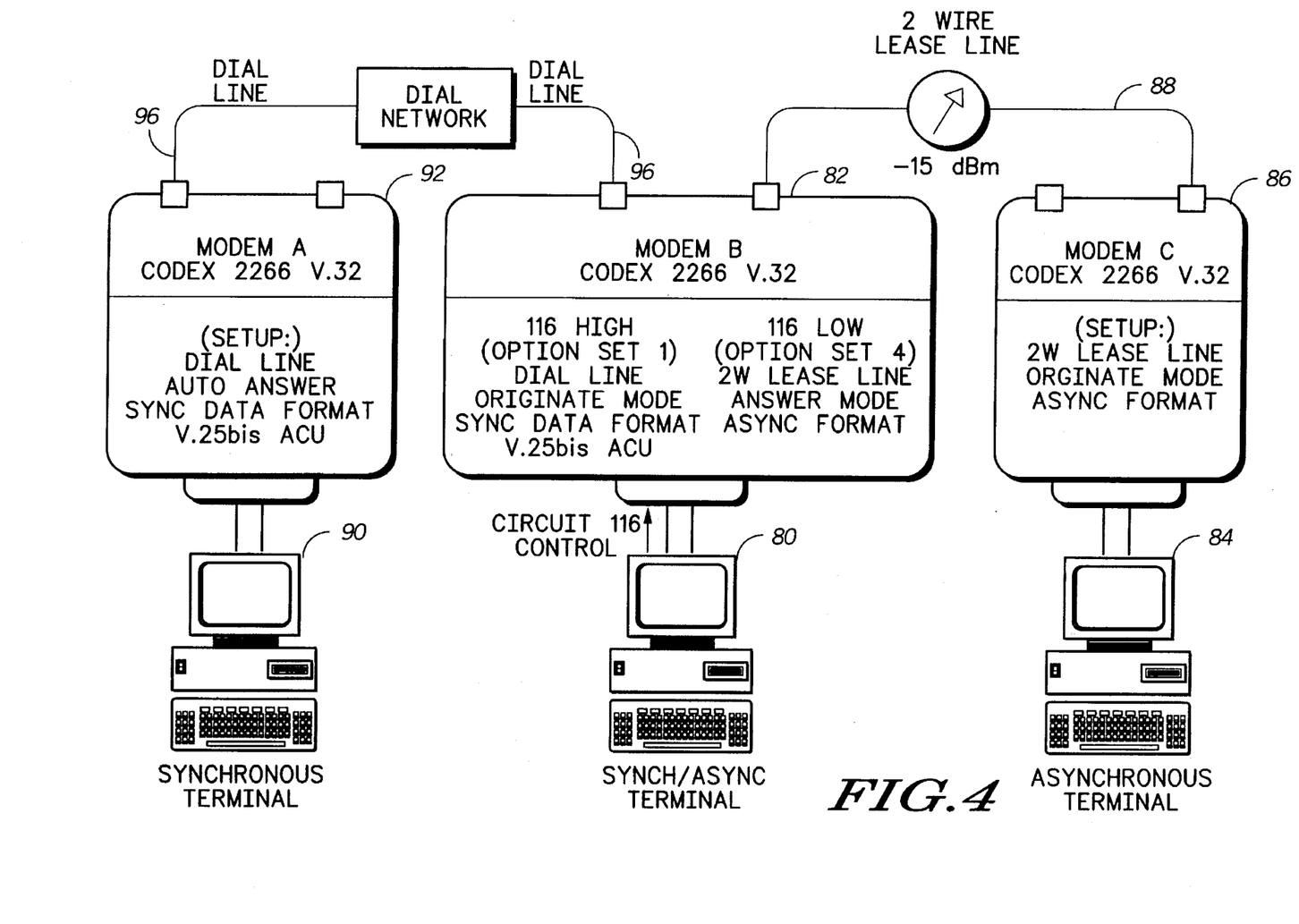
FIG. 4 is an illustration exemplifying dynamically switched communication on demand between a communication device and a selected one of either of two other mating communication devices in accordance with one aspect of the present invention.

The illustration of FIG. 4 exemplifies dynamically switched communication on demand between a communication device and a selected one of either of two other mating devices. More specifically, a data terminal 80 communicates through communication apparatus 82 referred to as Modem B. The combined communication set 80/82 is shown coupled to another data terminal 84 through a first mating communication device 86 referred to as Modem C. In this example, a two wire leased line 88 is used as a communication medium therebetween. Another data terminal 90 is coupled to a second mating communication device 92 referred to as Modem A. The combined equipment 80/82 may be coupled to the combined communication equipment 90/92 over a conventional dial network 94 using conventional dial lines 96. The Modems A,B and C may be of the type manufactured by Codex bearing Model No. 2266 of the V.32 variety. A command signal may be provided by the data terminal 80 to the communication apparatus 82 over a circuit 116 which may be a part of the communication protocol between the units 80 and 82.

In the illustration of FIG. 4, the data terminal 80 desires to communicate with the data terminal 84 through respective Modems 82 and 86 over the two wire lease line 88 under normal operations. Thus, the command signal 116 is set low and the set of configurables associated with option data bank 4 is loaded into the active configurable memory to allow the Modem 82 to configure itself compatible with the Modem 86. Should the communication over the leased line 88 be discontinued for any reason, the data terminal 80 detects this condition and switches the state of the command signal 116 to a high state. The Modem 82 responds dynamically to the change of state of the command signal 116 in accordance with the flowcharts of FIGS. 3A and 3B to alter its communication configuration to that of the set of configurables in the option data bank 1 so that it is compatible with the Modem 92 in order to communicate with the data terminal 90 in a dial environment. Thus, Modem 82 is dynamically operative to switch communication between itself and either the first mating communication device or the second mating communication device in response to the command signal 116 as exemplified in the illustration of FIG. 4.

While the present invention has been described in connection with a particular embodiment, it is understood that modifications and additions may be made to this embodiment or even an equivalent embodiment used without deviating from the broad principals of the present invention. Accordingly, the present invention should not be limited to any single embodiment but rather construed in both scope and breath in accordance with the recitation of the appended claims.

We claim:

1. Communication apparatus operative to switch communication dynamically between itself and any one of at least two mating communication devices selected from a predetermined multiplicity of mating communication devices of differing configurations, said communication apparatus comprising:

first means for storing a multiplicity of different sets of configurables, each set of configurables of a predetermined multiplicity of mating communication devices corresponding to a communication configuration associated with a corresponding mating communication device of said predetermined multiplicity of mating devices, each set of configurables being indexed by a unique memory address in said first means for storing a multiplicity of different sets of configurables;

second means for storing the index memory addresses of sets of configurables corresponding to the communication apparatus and at least one of the at least two mating communication devices;

third storing means loadable with a set of configurables from said first means for use by said communication apparatus to functionally configure itself for communicating with the mating communication device associated therewith; and control means, operably coupled to the first means, the second means, and the third storing means, responsive to a command signal to select an index memory address from said second means and to load the third storing means with the set of configurables from the first means corresponding to said selected index memory address, whereby the communication apparatus will functionally configure itself in accordance with the set of configurables selected by the command signal.

2. The communication apparatus in accordance with claim 1 including an entry device coupled to the control means for entering the index memory addresses of the communication apparatus and at least one of the at least two mating communication devices into the second means.

3. The communication apparatus in accordance with claim 1 wherein the first means includes a multiplicity of memory storage banks for storing correspondingly each of the multiplicity of different sets of configurables, each of said multiplicity of memory storage banks being indexed by the index memory address of a corresponding set of configurables of said multiplicity of memory storage banks; and wherein the control means includes means responsive to the command signal to select an index memory address from the second means and to load the third storing means with the set of configurables accessed from the memory storage bank corresponding to the selected index memory address.

4. The communication apparatus in accordance with claim 1 wherein the first means is of a non-volatile type and the third storing means is of a volatile type.

5. A modem operative to switch communication dynamically between itself and a selected one of a predetermined plurality of mating modems of differing configurations, said modem comprising:

first storing means for storing a plurality of different sets of configurables, each set of configurables of said plurality of sets of configurables corresponding to a modem communication configuration associated with a corresponding mating modem of said predetermined plurality of mating modems, each set of configurables being indexed in said first storing means by a unique memory address in said first storing means which stores a multiplicity of different sets of configurables; second storing means for storing the index memory addresses of at least two sets of configurables of said plurality of different sets of configurables corresponding to the modem and at least one of the predetermined plurality of mating modems; and modem control means, coupled to said first and second storing means, responsive to a command signal to select an index memory address in the second memory means for use by said modem to functionally configure itself in accordance with the set of configurables in said first storing means corresponding to the index memory address selected by the command signal to select an index memory address from said second storing means for use by the modem to load and access the set of configurables corresponding to said selected index memory address, the modem further including an entry device coupled to the modem control means for entering the index memory addresses of the at least two sets of configurables into the second storing means.

6. Communication apparatus operative to switch communication dynamically between itself and any one of a plurality of mating communication devices of differing configurations, said communication apparatus comprising:

first means for storing a plurality of different sets of configurables, each set of configurables of said plurality of configurables corresponding to a communication configuration associated with a corresponding mating communication device of said plurality of mating communication devices, each set of configurables being indexed by a unique memory address in said first means which stores a multiplicity of different sets of configurables; second means for storing the index memory addresses of sets of configurables corresponding to the communication apparatus and at least one of the plurality of mating communication devices; and communication apparatus control means coupled to said first and second means and responsive to a command to switch communication of said communication apparatus from a first mating communication device to a second mating communication device of said plurality of mating communication devices to dynamically control said communication apparatus to switch from using the set of configurables of said first means associated with the first mating communication device to using the set of configurables of said first means associated with the second mating communication device for establishing the communication configuration by selecting an index memory address from said second means and loading the set of configurables corresponding to said selected index memory address, wherein the first means includes a plurality of memory storage banks for storing correspondingly each of the plurality of different sets of configurables; and the communication apparatus control means includes means responsive to said command to dynamically control the communication apparatus to switch from using the set of configurables of one of said plurality of memory storage banks associated with the first mating communication device to using the set of configurables of one of said plurality of memory storage banks associated with the second mating communication device for establishing the communication configuration thereof, the communication apparatus further including an active configuration memory loadable with a set of configurables from said first means, said configurables loaded into the active configuration memory being used by said communication apparatus to functionally configure itself for communicating with a chosen mating communication device.

7. The communication apparatus in accordance with claim 6 wherein the communication apparatus control means includes means responsive to said command to dynamically load the set of configurables of one of said plurality of memory storage banks associated with the second mating communication device into the active configuration memory for use by the communication apparatus in functionally configuring itself to communicate with the second mating communication device in accordance with said command.

8. The communication apparatus in accordance with claim 6 wherein the plurality of memory storage banks are of a non-volatile type and the active configuration memory is of a volatile type.

9. A modem operative to switch communication dynamically between itself and any one of a plurality of mating modems of differing configurations, said modem comprising:

first storing means for storing a plurality of different sets of configurables, each set of configurables of said plurality of configurables corresponding to a modem configuration associated with a corresponding mating modem of said plurality of mating modems, each set of configurables being indexed by a unique memory address in said first storing means which stores a multiplicity of different sets of configurables; second storing means for storing the index memory addresses of sets of configurables corresponding to the modem and at least one of the plurality of mating modems; and modem control means coupled to said first and second storing means and responsive to a command to switch communication of said from a first mating modem to a second mating modem of said plurality of mating modems to dynamically control said modem to switch from using the set of configurables of said first storing means associated with the first mating modem to using the set of configurables of said first storing means associated with the second mating modem for establishing the modem communication configuration by selecting an index memory address from said second storing means and loading the set of configurables corresponding to said selected index memory address, wherein the first storing means includes a plurality of memory storage banks for storing correspondingly each of the plurality of different sets of configurables; and the modem control means includes means responsive to said command to dynamically control the modem to switch from using the set of configurables of one of said plurality of memory storage banks associated with the first mating modem to using the set of configurables of one of said plurality of memory storage banks associated with the second mating modem for establishing the modem communication configuration thereof, the modem further including an active configuration memory loadable with a set of configurables from said first storing means, said configurables loaded into the active configuration memory being used by said modem to functionally configure itself for communicating with a chosen mating modem.

10. The modem in accordance with claim 9 wherein the modem control means includes means responsive to said command to dynamically load the set of configurables of one of said plurality of memory storage banks associated with the second mating modem into the active configuration memory for use by the modem in functionally configuring itself to communicate with the second mating modem in accordance with said command.

11. The modem in accordance with claim 9 wherein the plurality of memory storage banks are of a non-volatile type and the active configuration memory is of a volatile type.

12. A modem operative to switch communication dynamically between itself and any one of at least two mating modems selected from a predetermined multiplicity of mating modems of differing configurations, said modem comprising:

first means for storing a multiplicity of different sets of configurables, each set of configurables of a predetermined multiplicity of mating modems corresponding to a modem communication configuration associated with a corresponding mating modem of one of said predetermined multiplicity of mating modems, each set of configurables being indexed by a unique memory address in said first means for storing a multiplicity of different sets of configurables;

second means for storing the index memory addresses of the sets of configurables of one of the predetermined multiplicity of mating modems corresponding to the modem and at least one of the at least two mating modems;

third storing means loadable with a set of configurables from said first means for use by said modem to functionally configure itself for communicating with the mating modem associated therewith; and control means, operably coupled to the first means, the second means, and to the third storing means, responsive to a command signal to select an index memory address from said second means and to load the third storing means with the set of configurables from the first means corresponding to said selected index memory address, whereby the modem will functionally configure itself in accordance with the set of configurables selected by the command signal.

13. The modem in accordance with claim 12 including an entry device coupled to the control means for entering the index memory addresses of the modem and at least one of the at least two mating modems into the second means.

14. The modem in accordance with claim 12 wherein the first means includes a multiplicity of memory storage banks for storing correspondingly each of the multiplicity of different sets of configurables, each of said multiplicity of memory storage banks being indexed by the index memory address of a corresponding set of configurables of said multiplicity of memory storage banks; and wherein the control means includes means responsive to the command signal to select an index memory address from the second means and to load the third storing means with the set of configurables accessed from the memory storage bank corresponding to the selected index memory address.

15. The modem in accordance with claim 12 wherein the first means is of a non-volatile type and the third storing means is of a volatile type.

\* \* \* \* \*